United States Patent [19]

Shintani et al.

[11] Patent Number: 4,623,689

[45] Date of Patent: Nov. 18, 1986

[54] AQUEOUS COLORED POLYMER, PROCESS FOR PREPARING SAME AND INK COMPRISING SAME

[75] Inventors: Takashi Shintani; Noriaki Emura, both of Tokuyama; Tetsuo Tanaka, Hofu; Yasuhiro Oda, Tokuyama, all of Japan

[73] Assignee: Toyo Soda Manufacturing Co., Ltd., Shinnanyo, Japan

[21] Appl. No.: 625,254

[22] Filed: Jun. 27, 1984

[30] Foreign Application Priority Data

| Jun. 29, 1983 | [JP] | Japan | 58-116063 |
| Jul. 1, 1983 | [JP] | Japan | 58-118121 |
| Jul. 12, 1983 | [JP] | Japan | 58-125463 |
| Aug. 11, 1983 | [JP] | Japan | 58-145744 |
| Aug. 12, 1983 | [JP] | Japan | 58-146470 |
| Oct. 31, 1983 | [JP] | Japan | 58-202675 |
| Mar. 26, 1984 | [JP] | Japan | 59-56281 |

[51] Int. Cl.$^4$ ............................................. C08L 41/00
[52] U.S. Cl. ................................ 524/457; 106/22; 260/DIG. 38; 524/543; 524/609
[58] Field of Search .................... 106/20, 22; 260/DIG. 38; 524/457, 543, 609

[56] References Cited

U.S. PATENT DOCUMENTS 3,923,755  12/1975  Piloni .............................. 526/311

FOREIGN PATENT DOCUMENTS 2080340  7/1977  Japan.

OTHER PUBLICATIONS

Protzman et al: "An Apparatus for the Determination of the Minimum Film Temperature of Polymer Emulsions," J. Appl. Polymer Science, vol. IV, Issue 10, pp. 81–85 (1960).

Primary Examiner—Amelia B. Yarbrough
Attorney, Agent, or Firm—Cushman, Darby & Cushman

[57] ABSTRACT

An aqueous colored polymer is provided, which comprises (a) a homopolymer of an ethylenically unsaturated sulfonic acid or its salt or (b) a copolymer of an ethylenically unsaturated sulfonic acid or its salt with other ethylenically unsaturated monomer, said homopolymer or copolymer being dyed with a basic dye and having a lowest film-forming temperature of not higher than 35° C. The aqueous colored polymer is prepared by polymerizing an ethylenically unsaturated sulfonic acid or its salt, or its mixture with other ethylenically unsaturated monomer by an aqueous solution or emulsion polymerization procedure at a temperature of not higher than 100° C. in a specified amount of water and then adding a basic dye to the resulting polymer solution or emulsion, or carrying out this solution or emulsion polymerization in the presence of a basic dye. The aqueous polymer is useful as an aqueous ink such as an ink for the ink jet recording.

11 Claims, No Drawings

AQUEOUS COLORED POLYMER, PROCESS FOR PREPARING SAME AND INK COMPRISING SAME

BACKGROUND OF THE INVENTION (1) Field of the Invention

The present invention relates to an aqueous colored polymer. More particularly, it relates to an aqueous colored polymer having a film-forming property at normal temperature, and a process for the preparation thereof and uses thereof. More specifically, the present invention relates to an aqueous colored polymer containing a sulfonic acid group, which is dyed with a basic dye, and a process for the preparation thereof and uses thereof.

(2) Description of the Prior Art

Inorganic or organic pigments have heretofore been used for coloring aqueous polymer emulsions or aqueous polymer solutions. Furthermore, acid dyes and direct dyes have also been used in the form of aqueous solutions thereof.

Such conventional techniques, however, have various defects as described below. Namely, the coloration with pigments is restricted because the number of colors of the pigments is limited, and it is impossible to increase the color value. Moreover, the pigments are expensive. Furthermore, in order to attain the intended coloring effect in an aqueous ink or the like, it is necessary to pulverize pigments into fine particles according to various methods and disperse the resulting fine particles in water with use of a large quantity of a dispersing agent or dispersion stabilizer. Accordingly, preparation of such aqueous dispersions of pigments is very difficult. Moreover, when aqueous inks are prepared from these aqueous dispersions, sedimentation of the pigment particles occurs with the lapse of time, and thus, the storage stability of products is poor and clogging of ink nozzles is readily caused. In an extreme case, attainments of the intended effect or application to the intended use becomes impossible.

In this process for coloring an aqueous polymer with a pigment dispersion, a polymer emulsion or aqueous polymer acts as a binder for the pigment, and the polymer per se present in the emulsion or aqueous solution is not colored.

In case of the coloring method using an aqueous solution of an acid dye or direct dye as a colorant, such as an aqueous ink, since the dye per se is water-soluble, the water resistance of a colored material after drying is very poor and blurring of the color is caused by water or sweat, or the color is readily washed away. Also in this case, the polymer per se is not colored.

As means for overcoming the defects of the coloring method using a pigment dispersion, there has been proposed a process in which colored particles of an acrylonitrile polymer are used as a colorant for an aqueous polymer emulsion (see Japanese Unexamined Patent Publication No. 52-80340).

This process, however, requires a special polymerization process (for example, the polymerization is carried out at a temperature of at least 120° C. under a high pressure of 5 to 50 atmospheres) for obtaining such a finely divided polymer that colored polymer particles can be used as a colorant. Moreover, since the monomer composition constituting the polymer particles is restricted, the polymer particles cannot be applied to uses where good film-forming property and flexibility are required.

As pointed out hereinbefore, it is known that a water-soluble dye can be used as an aqueous colorant, and basic dyes are excellent over other dyes in the color abundance and the color brightness. However, basic dyes are not satisfactory because of poor light fastness.

SUMMARY OF THE INVENTION

It is a primary object of the present invention to provide an aqueous colored polymer useful as a coloring material which is formed without using as a binder conventional colored particles (such as pigment particles or colored polymer particles as disclosed in Japanese Unexamined Patent Publication No. 52-80340) (namely, the colored polymer per se is a binder) and which has an appropriate flexibility suitable for the intended use and shows a film-forming property at normal temperature.

Another object of the present invention is to provide an aqueous colorant in which the defects of colorants containing pigment particles such as aqueous inks are overcome and which is very excellent in the stability and light fastness and can effect coloration at a higher color value than the concentration attained by pigments.

In accordance with the present invention, there is provided an aqueous colored polymer which comprises (a) a homopolymer of an ethylenically unsaturated sulfonic acid or its salt or (b) a copolymer of an ethylenically unsaturated sulfonic acid or its salt with other ethylenically unsaturated monomer, said homopolymer or copolymer being dyed with a basic dye and having a film-forming temperature of not higher than 35° C. The present invention also provides a process for the preparation of this aqueous colored polymer and uses thereof. Namely, the present invention provides an aqueous ink, a line marker, an ink for the ink jet recording and a colorant for paper, fiber, leather or wood, each being excellent in the light fastness.

DESCRIPTION OF THE PREFERRED EMBODIMENTS

The aqueous colored polymer of the present invention is, in principle, in the form of an aqueous solution, an aqueous emulsion or a combination thereof. The polymer form is not particularly critical, and an optional form can be selected among these forms according to the kinds and composition of the constituent monomers, the preparation process and the intended use of the aqueous colored polymer.

In order to use the aqueous colored polymer effectively as an aqueous ink or a colorant for paper, pulp, fiber or wood, it is necessary to give the aqueous colored polymer such a property that a colored uniform film can be formed at a temperature of not higher than 35° C. Especially, in case of a colored polymer emulsion, appropriate monomers should be carefully chosen according to the intended use.

The monomers to be used for the production of the aqueous colored polymer of the present invention may be selected from the following group A through D.

[Group A]

Ethylenically unsaturated sulfonic acids and salts thereof.

For example, there can be mentioned ethylenically unsaturated sulfonic acids such as vinylsulfonic acid, allylsulfonic acid, methallylsulfonic acid, styrene-sulfonic acid, 2-acrylamido-2-methylpropane-sulfonic acid, vinylbenzylsulfonic acid, acryloyloxyethylsulfonic acid, methacryloyloxyethylsulfonic acid and a vinyl ester of an alkylsulfosuccinic acid, and salts thereof such as lithium, sodium, potassium and ammonium salts.

[Group B]

Hydrophilic functional group-containing ethylenically unsaturated monomers other than ethylenically unsaturated sulfonic acids and salts thereof.

For example, there can be mentioned acrylamide, methacrylamide, 2-hydroxyethyl acrylate, 2-hydroxyethyl methacrylate, aminoethyl acrylate, aminoethyl methacrylate, dimethylaminoethyl acrylate and dimethylaminoethyl methacrylate.

[Group C]

Hydrophobic ethylenically unsaturated monomers which give polymers having a relatively low film-forming temperature by polymerization.

For example, there can be mentioned ethylene, isobutylene, butadiene, isoprene, 2-chloro-1,3-butadiene, methyl acrylate, ethyl acrylate, n-propyl acrylate, n-butyl acrylate, t-butyl acrylate, isobutyl acrylate, n-hexyl acrylate, cyclohexyl acrylate, n-octyl acrylate, 2-ethylhexyl acrylate, dodecyl acrylate, tetradecyl acrylate, n-propyl methacrylate, n-butyl methacrylate, t-butyl methacrylate, isobutyl methacrylate, n-hexyl methacrylate, n-octyl methacrylate, 2-ethylhexyl methacrylate, dodecyl methacrylate, vinyl acetate, vinyl propionate and vinylidene chloride.

[Group D]

Hydrophobic ethylenically unsaturated monomers which give polymers having a relatively high film-forming temperature by polymerization.

For example, there can be mentioned styrene, methylstyrene, chlorostyrene, methyl methacrylate, ethyl methacrylate, acrylonitrile, methacrylonitrile and vinyl chloride.

The aqueous colored polymer of the present invention is, in principle, prepared by polymerizing at least one monomer of the group A or copolymerizing at least one monomer of the group A with at least one other copolymerizable monomer selected from the monomers of the groups B, C and D and dyeing the obtained aqueous polymer with a basic dye or by carrying out the above polymerization in the presence of a basic dye.

An aqueous solution of a colored homopolymer or copolymer, included within the scope of the aqueous colored polymer of the present invention, is prepared by polymerizing at least one monomer of the group A as the indispensable component or copolymerizing it with at least one other copolymerizable monomer selected from the monomers of the groups B, C and D and dyeing the obtained water-soluble polymer with a basic dye or by carrying out the above polymerization in the presence of a basic dye.

In view of the light resistance and flexibility of the aqueous colored polymer, it is preferred that, for example, if sodium styrenesulfonate is used in combination with 2-hydroxyethyl methacrylate, the monomer composition comprises 5 to 80 parts by weight of sodium styrenesulfonate and 95 to 20 parts by weight of 2-hydroxyethyl methacrylate, and if sodium styrenesulfonate is used in combination with 2-hydroxyethyl acrylate and methacrylamide, the monomer composition comprises 5 to 60 parts by weight of sodium styrenesulfonate, 95 to 40 parts by weight of 2-hydroxyethyl acrylate and 10 to 50 parts by weight of methacrylamide. In view of the light resistance of the aqueous colored polymer, it is preferable to use an ethylenically unsaturated monomer having a hydroxyl group or an amide group as a comonomer to be copolymerized with an ethylenically unsaturated sulfonic acid or its salt.

The water-soluble polymer satisfying the requirements of the present invention can be prepared according to various processes. For example, the polymerization can easily be accomplished by introducing the monomer components collectively or dividedly or in a continuous manner together with an ordinary radical polymerization initiator into a polymerization vessel with stirring in water. The polymerization may be carried out at a temperature of 40° to 100° C.

The molecular weight of the water-soluble polymer obtained according to this process depends on the concentrations of the respective monomers present in the polymerization system, the amount of the radical polymerization initiator used and the polymerization temperature.

The monomer concentration is not particularly critical but it is ordinarily in the range of 3 to 50% by weight, preferably 10 to 40% by weight. If the monomer concentration is too high, the viscosity of the polymerization system is increased and removal of the polymerization heat becomes difficult. From the economical viewpoint, it is not preferable to carry out the polymerization at too low monomer concentration.

If the amount used of the radical polymerization initiator is large, the molecular weight of the water-soluble polymer tends to be reduced. In contrast, if the amount used of the radical polymerization initiator is small, the molecular weight of the water-soluble polymer tends to increase.

In view of the gist of the present invention, it will readily be understood that the scope of the present invention is not limited by the process for the preparation of the water-soluble polymer.

The colored polymer or copolymer in the form of an aqueous emulsion, which is included within the scope of the present invention, is prepared by using the monomers of the groups A and C as the indispensable components, (1) copolymerizing at least one monomer selected from the monomers of the group A with at least one monomer selected from the monomers of the group C or (2) copolymerizing at least one monomer selected from the monomers of the group A with at least one monomer selected from the monomers of the group C and at least one monomer selected from the monomers of the groups B and D and dyeing the obtained polymer in the form of an aqueous emulsion with a basic dye, or by carrying out the above polymerization in the presence of a basic dye.

Namely, the colored polymer in the form of an aqueous emulsion according to the present invention is a colored polymer emulsion comprising particles of a copolymer of a hydrophilic ethylenically unsaturated monomer containing at least an ethylenically unsaturated sulfonic acid or its salt with at least one hydrophobic ethylenically unsaturated monomer, said copolymer particles being dyed with a basic dye, wherein (a) the copolymer particles contain a sulfonic acid group in an amount of at least $2 \times 10^{-5}$ gram-equivalent per g polymer and (b) the copolymer particles have an average particle size of not larger than 1 μm.

This colored polymer emulsion is prepared by emulsion-polymerizing 100 g of a monomeric mixture comprised of (1) up to 10 g of a hydrophilic ethylenically unsaturated monomer containing an ethylenically unsaturated sulfonic acid or its salt in an amount of at least $2 \times 10^{-3}$ gram-equivalent and (2) at least 90 g of at least one hydrophobic ethylenically unsaturated monomer (the hydrophobic unsaturated monomer having a monomer composition giving a colored polymer emulsion having a film-forming temperature of not higher than 35° C.) in the presence of water in an amount of 35 to 85% by weight based on the total amount of the monomeric mixture and water at a temperature of not higher than 100° C. and adding a basic dye to the formed emulsion, or by carrying out the above emulsion polymerization in the presence of a basic dye.

The polymer in this emulsion contains a sulfonic acid group or its salt introduced therein in an amount of at least $2 \times 10^{-5}$ gram-equivalent/g of the polymer, preferably at least $5 \times 10^{-5}$ gram-equivalent/g of the polymer, and the polymer is dispersed in the form of particles having an average particle size of not larger than 1 μm, preferably not larger than 0.3 μm, and being colored with the basic dye.

Typical instances of the ethylenically unsaturated sulfonic acid or its salt to be used for the preparation of this emulsion are monomers of the group A, and as the hydrophilic ethylenically unsaturated monomer to be used in combination with the ethylenically unsaturated sulfonic acid or its salt, there can be mentioned monomers of the group B.

The ethylenically unsaturated sulfonic acid or its salt and other hydrophilic ethylenically unsaturated monomer are used in an amount of up to 10 g per 100 g of the total monomers, and the ethylenically unsaturated sulfonic acid or its salt is contained in an amount of at least $2 \times 10^{-3}$ gram-equivalent.

The hydrophobic ethylenically unsaturated monomer to be used for the preparation of this emulsion is selected while the film-forming property, pliability, mechanical strength, hardness and tackiness of the colored polymer obtained from the polymer emulsion are taken into consideration.

In order to provide a colored polymer emulsion effectively used as an aqueous ink or colorant excellent in the water resistance, it is necessary to give the polymer emulsion such a property that a colored uniform continuous film is formed at a temperature of not higher than 35° C.

It is known that the film-forming temperature of a polymer emulsion is ordinarily influenced by the particle size of the polymer emulsion, the kind of the emulsifier or protective colloid used and the polymer concentration, but the film-forming temperature is determined predominantly by the composition of monomers constituting the polymer particles in the emulsion.

The hydrophobic ethylenically unsaturated monomer to be used for the preparation of the polymer emulsion is selected from monomers of the group C providing polymers having a relatively low film-forming temperature by polymerization and monomers of the group D providing polymers having a relatively high film-forming temperature by polymerization.

The monomer of the group C is an indispensable component for the preparation of the colored polymer emulsion. The monomer of the group D is not an indispensable component but is preferably used for adjusting the pliability, hardness and tackiness of the intended polymer. Namely, by the use of the monomer of the group D, the hardness of the polymer tends to increase while the tackiness tends to be reduced.

For the preparation of the polymer emulsion of the present invention, at least one monomer of the group C and at least one monomer of the group D may be used in combination in amounts of at least 30 parts by weight and up to 60 parts by weight, respectively, per 100 parts by weight of the total monomers.

In view of the hardness, pliability and strength of the obtained film, it is preferable that, for example, if styrene and n-butyl acrylate are used, the monomer composition comprises 20 to 55 parts by weight of styrene, 80 to 45 parts by weight of n-butyl acrylate, 1 to 5 parts by weight of sodium p-styrene-sulfonate and up to 3 parts by weight of 2-hydroxyethyl acrylate, and, if methyl methacrylate and ethyl acrylate are used, the monomer composition comprises 10 to 45 parts by weight of methyl methacrylate, 90 to 55 parts by weight of ethyl acrylate, 1 to 5 parts by weight of sodium p-styrene-sulfonate and up to 3 parts by weight of acrylic acid.

These monomers are polymerized in water in the presence of an ethylenically unsaturated sulfonic acid or its salt, whereby the sulfonic acid group can be introduced into the polymer particle in an amount of at least $2 \times 10^{-5}$ gram-equivalent/g of the polymer.

If the amount of the introduced sulfonic acid group is too small, agglomerates of the polymer are formed during polymerization and fine polymer particles cannot be obtained. If the amount of the sulfonic acid group introduced into the polymer is too large, the size of the polymer particles becomes too fine and the viscosity of the polymer emulsion is extremely increased, with the result that it is difficult to prepare a polymer emulsion having a high concentration. Accordingly, from the practical viewpoint, it is preferred that the sulfonic acid group be introduced into the polymer in an amount of up to $5 \times 10^{-4}$ gram-equivalent/g of the polymer. Incidentally, the concentration of the sulfonic acid group in the polymer is measured by determining the content of sulfur according to the combustion method.

The polymerization initiator to be used for the above polymerization may be introduced collectively, dividedly or continuously into a polymerization vessel according to the conventional emulsion polymerization procedures, as in case of the monomers.

In order to remove the polymerization heat or effectively introduce the sulfonic acid group into the polymer, it is preferred that the respective components be added dividedly or continuously. A surface active agent or protective colloid, such as polyvinyl alcohol, customarily used for emulsion polymerization may be made present in the polymerization system. The polymerization may be sufficiently advanced at a polymerization temperature of not higher than 100°, ordinarily 30° to 90° C.

In the case where a colored polymer emulsion is prepared by making a basic dye present in the emulsion polymerization system, the dye may be added collectively, dividedly or continuously. Furthermore, the dye may be added in the form of an aqueous solution or a solution in the monomer to be used for the polymerization. When a colored polymer emulsion is prepared by emulsion polymerization in the presence of a basic dye, in view of the resistance of the dye to discoloration or color fading, it is preferred that the emulsion polymerization be carried out while maintaining the pH value of the polymerization system at 2 to 7.

The average particle size of the polymer particles obtained by the above polymerization process depends on the amount used of the surface active agent present in the polymerization system, the amount used of the ethylenically unsaturated sulfonic acid or its salt, the amount used of the polymerization initiator, the amount used of water and the polymerization temperature.

In principle, as the amount used of the surface active agent or the ethylenically unsaturated sulfonic acid or its salt is increased, the particle size tends to decrease, and as the amount used of the polymerization initiator is increased, the particle size tends to decrease. Furthermore, as the amount used of water is reduced, the particle size tends to increase.

If the average particle size of the polymer particles in the polymer emulsion exceeds 1 μm, the storage stability of the colored polymer emulsion is degraded. Although a higher concentration of the polymer emulsion is economically advantageous, if the amount of water in the polymer emulsion is smaller than 35% by weight, the flowability of the polymer emulsion is reduced and the viscosity is increased, with the result that the preparation becomes difficult. The use of water in an amount exceeding 80% by weight is not preferred from the economical viewpoint.

As is apparent from the gist of the present invention, the scope of the present invention is not limited by the process for the preparation of the aqueous polymer emulsion.

As the radical polymerization initiator to be used for the production of the aqueous colored polymer of the present invention described in detail hereinbefore, there can be mentioned ordinary polymerization initiators, for example, persulfates such as potassium persulfate and ammonium persulfate, and organic peroxides such as cumene hydroperoxide and t-butyl hydroperoxide. Moreover, so-called redox type polymerization initiators to be used in combination with reducing agents such as acidic sulfites and ferrous sulfate may be used.

Dyeing of the thus-obtained water-soluble polymer or aqueous polymer emulsion particles may be accomplished according to a customary dyeing method by adding an aqueous solution of a desired basic dye to the aqueous polymer solution or aqueous polymer emulsion. Furthermore, as described hereinbefore, the basic dye may be made present in the polymerization system.

Typical instances of the basic dye referred to in the present invention are basic dyestuffs described in the Color Index compiled by the British Society of Dyers and Colourists and the American Association of Textile Chemists and Colorists. More specifically, as the yellow basic dyes, there can be mentioned C.I. (Color Index) Basic Yellows 1, 2, 4, 11, 13, 14, 15, 19, 21, 23, 24, 25, 28, 29, 32, 33, 36, 39, 40, 41, 45, 49, 51, 56, 61, 63, 67, 70, 73, 77, 85, 87 and 91. As the orange basic dyes, there can be mentioned C.I. Basic Oranges 2, 15, 21, 22, 28, 29, 30, 32, 33, 34, 36, 40, 42, 46, 47, 57 and 58. As the red basic dyes, there can be mentioned C.I. Basic Reds 2, 9, 12, 13, 14, 15, 18, 22, 23, 24, 27, 29, 35, 36, 38, 46, 46:1, 51, 52, 54, 59, 60, 68, 69, 70, 74, 75, 78, 81, 82, 100, 102, 104 and 109. As the violet basic dyes, there can be mentioned C.I. Basic Violets 1, 2, 3, 7, 10, 11, 14, 15, 16, 20, 21, 25, 27, 28, 35, 37, 39, 40, 44 and 48. As the blue basic dyes, there can be mentioned C.I. Basic Blues 1, 3, 5, 7, 9, 21, 22, 25, 26, 33, 41, 44, 45, 47, 54, 57, 62, 64, 65, 66, 67, 69, 71, 75, 77, 78, 85, 89, 92, 93, 104, 105, 109, 117, 120, 122, 124, 129, 137 and 141. As the green basic dyes, there can be mentioned C.I. Basic Greens 1, 4, 8 and 9. As the black basic dyes, there can be mentioned C.I. Basic Blacks 2 and 8.

When the polymer is dyed after the preparation of the polymer, dyeing is accomplished most conveniently according to the following method. Namely, the pH value of the aqueous polymer solution or emulsion is adjusted to 2 to 7, preferably 3 to 5, by an organic acid such as formic acid, acetic acid, butyric acid, tartaric acid or malic acid, an inorganic acid such as hydrochloric acid or sulfuric acid, or an aqueous solution of sodium hydroxide or sodium carbonate, and then, an aqueous solution of a basic dye is added to the aqueous polymer. Of course, the scope of the present invention is by no means limited by the dyeing method.

When the colored water-soluble homopolymer or copolymer in the form of an aqueous solution, included in the scope of the present invention, is dyed with the basic dye at a high concentration, a water-insoluble colored polymer is obtained. However, we have found that a water-insoluble colored polymer obtained by dyeing a water-soluble polymer containing a hydroxyl group in an amount of at least $1 \times 10^{-3}$ gram-equivalent/g polymer and a sulfonic acid group in an amount of at least $1 \times 10^{-4}$ gram-equivalent/g polymer with a basic dye, is soluble in a mixed solvent of a specific water-soluble organic solvent and water and that a solution of this colored polymer can be used as an aqueous ink having a good water resistance.

In principle, this aqueous colored polymer is prepared by dyeing a water-soluble polymer containing hydroxyl and sulfonic acid groups with a basic dye at a high concentration according to the above-mentioned dyeing method and incorporating and dissolving a specific water-soluble organic solvent represented by the following general formula (I) or (II) into the resulting aqueous suspension of the water-insoluble colored polymer before or after the dyeing operation:

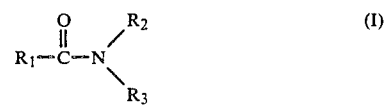

wherein $R_1$ stands for a hydrogen atom or a methyl group, and $R_2$ and $R_3$ stand for a hydrogen atom or a methyl or ethyl group, or

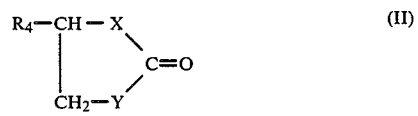

wherein $R_4$ stands for a hydrogen atom or a methyl group, X stands for a group NH or $NCH_3$ or an oxygen atom, and Y stands for a group $CH_2$ or an oxygen atom.

The reason why the water-soluble polymer of the present invention is rendered water-insoluble by dyeing it with a basic dye at a high concentration has not theoretically been elucidated. However, it is believed that the sulfonic acid group in the water-soluble polymer is rendered hydrophobic by the basic dye and a water-insoluble colored polymer is formed.

Since the obtained colored polymer contains a hydrophilic group such as a hydroxyl group, even if the colored polymer is water-insoluble, it is rendered soluble in an aqueous medium with the aid of a relatively small amount of the above-mentioned water-soluble organic solvent.

Since the aqueous colored polymer dissolved in a mixed solvent of water and the specific water-soluble organic solvent comprises the water-insoluble colored polymer as the base, an aqueous ink having an excellent water resistance and a good light fastness can be prepared from this aqueous colored polymer.

The specific water-soluble organic solvent is represented by the above general formula (I) or (II). As the water-soluble organic solvent represented by the general formula (I), there can be mentioned, for example, formamide, N-methylformamide, N,N'-dimethylformamide, N,N'-diethylformamide and acetamide. As the water-soluble organic solvent represented by the general formula (II), there can be mentioned, for example, ethylene carbonate, propylene carbonate, γ-butyrolactone, γ-methylbutyrolactone, 2-pyrrolidone, N-methyl-2-pyrrolidone and 1,3-dimethylimidazolidinone.

The water-soluble organic solvent is used in an amount of 5 to 50% by weight, preferably 10 to 40% by weight. If the amount of the water-soluble organic solvent used is too large, such troubles as blurring and penetration of the ink are caused.

According to the present invention, there can be provided a novel coloring material utilizable as an aqueous ink or aqueous colorant excellent in the color sharpness and light fastness, in which the sole defect of the basic dye, that is, poor light fastness, is overcome while characteristics of the basic dye, that is, good color abundance, sharpness and transparency, are retained.

The aqueous colored polymer of the present invention is very stable even if it is stored for a very long time, and undesirable phenomena caused in conventional pigment dispersions, such as color separation, phase separation and sedimentation, are not caused.

The aqueous colored polymer of the present invention has a high chemical stability and the change of the viscosity with the lapse of time is very small. Furthermore, if the aqueous colored polymer of the present invention is applied, for example, to an acidic paper surface such as no-carbon paper, discoloration or color fading is not caused.

The aqueous colored polymer of the present invention may be used as various aqueous inks, aqueous colorants and other coloring materials by utilizing such excellent characteristics as high light fastness and brightness. For example, the aqueous colored polymer may be used as an ink of a writing tool such as an aqueous ball point pen, a line marker or a felt pen or as an ink for the ink jet recording. Furthermore, the aqueous colored polymer of the present invention may be coated alone or in combination with other water-soluble polymer or aqueous polymer emulsion on wood, pulp, paper or fiber and used as a colorant for such materials. Moreover, the aqueous colored polymer of the present invention may be used after it is powdered by spray drying or the like.

The water-soluble colored polymer included in the scope of the present invention has an excellent light fastness and is characterized in that the staining property to the skin or clothes is much lower than ordinary inks composed of dye solutions. Moreover, the water-soluble colored polymer is characterized in that when it is applied to a film for an overhead projector, the formed letters or figures can easily be erased by water.

In the aqueous colored polymer emulsion included in the scope of the present invention, the polymer particles per se are dyed and the lowest film-forming temperature is not higher than 35° C. Accordingly, a uniform continuous colored film can be directly formed by normal temperature dyring, and the water resistance of the formed film is very excellent.

Therefore, a water-insoluble colored thin film is formed by printing, recording or writing, and bleeding of the ink or disappearance of printed figures or letters by water or sweat, as often observed in case of conventional aqueous inks, is not caused.

For the reason set forth above, the aqueous colored polymer emulsion included in the scope of the aqueous colored polymer of the present invention has a film-forming property at normal temperature. In case of a polymer emulsion having a film-forming temperature higher than 35° C., a uniform continuous film cannot be formed at normal temperature, and hence, this polymer emulsion is defective in that printing, recording or writing is impossible or a written, printed or recorded figure or letter is readily caused to disappear by friction or the like.

The aqueous colored polymer of the present invention having the above-mentioned characteristics can be used as an aqueous ink, a colorant or a coloring material in various fields. Various additives customarily used for ordinary aqueous inks or aqueous colorants, such as a drying property adjusting agent, an antiseptic agent and an anticorrosive agent, may be added to the aqueous colored polymer of the present invention.

As the drying property adjusting agent, there may be used, for example, so-called wetting agents such as glycerol, ethylene glycol, propylene glycol, diethylene glycol, polyethylene glycol, monoethanol amine, diethanol amine, triethanol amine, N-methyl-2-pyrrolidone and 1,3-dimethylimidazolidinone.

As the antiseptic or mildewproofing agent, there may be used sodium omazine, dioxine, propyl benzoate and methyl benzoate.

The present invention will now be described in detail with reference to the following examples that by no means limit the scope of the invention.

In the examples, "parts" and "%" are by weight unless otherwise indicated.

The concentration of the sulfonic acid group in the polymer was determined by measuring the sulfur content by the combustion method. The average particle size of the polymer emulsion was measured by the absorptiometric method.

The film-forming temperature of the colored polymer emulsion was measured by using an apparatus provided with a heat slope panel, proposed by Protzmann et al. [T. F. Protzmann and G. L. Brown; J. Appl. Polym. Sci., 4, 81 (1960)].

The light fastness was determined by coating an aqueous colored polymer solution or emulsion having a predetermined concentration on art paper by using a 1-mil doctor blade, drying the coated paper at room temperature, subjecting the sample to accelerated deterioration by using a xenon arc fade-ometer (at a black panel temperature of 65°±5° C. and a relative humidity of 35±5%) and comparing fading of the sample with the degree of fading on a blue scale according to JIS L-0841.

EXAMPLE 1

A polymerization flask, the inner atmosphere of which was substituted with nitrogen, was charged with 51.7 parts of sodium p-styrene-sulfonate having a purity of 81.2% (Spinomer NaSS supplied by Toyo Soda), 18 parts of acrylic acid and 225 parts of water, and the temperature was elevated to 80° C. with stirring in a nitrogen current. Then, a solution of 0.6 part of ammonium persulfate in 5 parts of water was added to the mixture, and polymerization was carried out at 90° C. for 5 hours with stirring and then the reaction mixture was cooled to room temperature to obtain a transparent aqueous polymer solution having a solution viscosity of 68 cps. The non-volatile component content of the aqueous solution at 110° C. was 20.6%. The conversion of sodium p-styrenesulfonate calculated from the analysis value of sulfur in the polymer obtained by re-precipitation with acetone and purification according to customary procedures was 99.2%. A dye solution formed by dissolving 0.5 part of a basic dye (Cathilon Blue 5GLH supplied by Hodogaya Kagaku) in 0.5 part of acetic acid and 10 parts of water was added to 50 parts of the thus-obtained aqueous polymer solution, and the mixture was stirred at 98° C. for 1 hour to dye the polymer solution. The dyed aqueous polymer solution was dropped into a large quantity of acetone, and the precipitated polymer was recovered by filtration and washed to obtain a colored polymer.

The colored polymer in the form of a 10% aqueous solution was added to a commercially available emulsion (Polytron A-45 supplied by Asahi Kasei) to color the emulsion. The aqueous colored polymer solution and the colored emulsion could be stably stored for more than 1 month.

When the colored emulsion was cast on a casting glass sheet and dried at room temperature, a transparent colored film was obtained. When a cut piece of the dried colored film was immersed in water for 1 week, the aqueous layer was not colored.

When an aqueous 10% solution of the colored polymer was cast on a casting glass plate and dried in a thermostat chamber maintained at 25° C., a transparent colored film was obtained.

EXAMPLE 2

A polymerization flask, the inner atmosphere of which was substituted with nitrogen, was charged with 15 parts of water and the temperature was elevated to 90° C. An aqueous solution of sodium p-styrene-sulfonate was prepared by dissolving 244 parts of sodium p-styrene-sulfonate having a purity of 82.0% (Spinomer NaSS supplied by Toyo Soda) in 710 parts of water. An aqueous soluton of a polymerization initiator was prepared by dissolving 3.5 parts of ammonium persulfate in 20 parts of water. These aqueous solutions of sodium p-styrene-sulfonate and the polymerization initiator were added into the polymerization flask over a period of 3 hours, and polymerization was carried out with stirring at 90° C. The polymerization mixture was maintained at 90° C. for 2 hours and then cooled to room temperature to obtain a transparent aqueous polymer solution having a solution viscosity of 35 cps.

From the analysis value of unreacted sodium p-styrene-sulfonate, it was found that the conversion of sodium p-styrene-sulfonate was higher than 99.0%.

Then, a solution of 0.5 part of a basic dye (Methylene Blue FZ, Cathilon Yellow T-RLH or Cathilon Red 6BH supplied by Hodogaya Kagaku) in 5 parts of water and 0.5 part of acetic acid was added to 50 parts of the thus-obtained aqueous solution of the water-soluble polymer and dyeing was carried at 100° C. for 90 minutes.

The dyed aqueous polymer solution was dropped into isopropanol, and the precipitated colored polymer was recovered by filtration, washed and dried to obtain a colored polymer. When the colored polymer obtained in this example was formed into an aqueous 20% solution, a transparent homogeneous aqueous solution of the colored polymer was obtained. This aqueous colored polymer solution was stable for more than 1 month. Letters could be written on art paper with a felt pen impregnated with this aqueous colored polymer solution. Moreover, the aqueous colored polymer was miscible at optional ratios with each of aqueous 2% solutions of commercially available sodium polyacrylate (Aron T-40 supplied by Toa Gosei), commercially available polyvinyl alcohol (Kuraray Poval 220E supplied by Kuraray) and commercially available carboxymethyl cellulose (Celogen WSA supplied by Daiichi Kogyo Seiyaku).

An aqueous 20% solution of the colored polymer was coated on art paper by a 2-mil doctor blade and dried at room temperature. When the resulting test piece was set at a fade-ometer and tested at a black panel temperature of 65° to 70° C. (no rain), it was found that the test piece had a light fastness higher than that of art paper coated with an aqueous solution of the dye.

When the aqueous 20% solution of the colored polymer obtained in this Example was cast on a casting glass plate and dried in a thermostat chamber maintained at 25° C., a transparent colored film was obtained.

EXAMPLE 3

A polymerization flask, the inner atmosphere of which was substituted with nitrogen, was charged with 15 parts of water, 20 parts of 2-hydroxyethyl methacrylate and 0.3 part of $NaHSO_3$, and the temperature was elevated to 60° C. with stirring in a nitrogen current. An aqueous solution of sodium p-styrene-sulfonate was prepared by dissolving 220 parts of sodium p-styrene-sulfonate having a purity of 82.0% (Spinomar NaSS supplied by Toyo Soda) in 700 parts of water. An aqueous solution of a polymerization initiator was prepared by dissolving 0.3 part of ammonium persulfate in 30 parts of water. These aqueous solutions of sodium p-styrene-sulfonate and the polymerization initiator were added over a period of 3 hours and polymerization was carried out at 60° C. Then, the polymerization mixture was maintained at 60° C. for 3 hours and cooled to room temperature to obtain a transparent aqueous polymer solution having a solution viscosity of 24 cps. The non-volatile component content at 110° C. was 20.1%.

A solution of 0.5 part of a basic dye (Cathilon ID-3GLH or Cathilon Red GLH supplied by Hodogaya Kagaku) in 10 parts of water and 0.5 part of acetic acid was added to 50 parts of the aqueous polymer solution, and the mixture was stirred at 100° C. for 1 hour to effect dyeing. The dyed aqueous polymer solution was dropped into isopropanol, and the precipitated colored polymer was recovered by filtration, washed and then dried to obtain a colored polymer.

The colored polymer was formed into an aqueous 10% solution, and the solution was coated on art paper by a 2-mil doctor blade and then dried at room temperature. When the light fastness was tested in the same manner as described in Example 2, it was found that the coated paper had an excellent light fastness.

Letters could be written on art paper, Kent paper and wood-free paper with a felt pen impregnated with the aqueous solution of the colored polymer. When the aqueous solution of the colored polymer was cast on a casting glass plate and then dried in a thermostat chamber maintained at 25° C., a transparent colored film was obtained.

EXAMPLES 4 THROUGH 6

A polymerization flask, the inner atmosphere of which was substituted with nitrogen, was charged with 50 parts of water and the temperature was elevated to 90° C. An aqueous solution of sodium p-styrene-sulfonate was prepared by dissolving 244 parts of sodium p-styrene-sulfonate having a purity of 82.0% (Spinomar NaSS supplied by Toyo Soda) in 720 parts of water. An aqueous solution of a polymerization initiator was prepared by dissolving 10 parts of ammonium persulfate in 30 parts of water.

These aqueous solutions of sodium p-styrene-sulfonate and the polymerization initiator were added into the polymerization flask over a period of 3 hours, and polymerization was carried out at 90° C. Polymerization was further conducted at 90° C. for 2 hours and the polymerization mixture was cooled to 25° C. to obtain an aqueous polymer solution having a solution viscosity of 9.3 cps as measured at 25° C.

When unreacted sodium p-styrene-sulfonate was determined according to the bromine addition method, it was found that the conversion of sodium p-styrene-sulfonate was higher than 99.0%.

The formed polymer was purified by dropping the aqueous polymer solution into anhydrous ethanol to obtain a powder of a water-soluble polymer. The average molecular weight $\overline{Mw}$ of the polymer determined according to the gel permeation chromatography method (hereinafter referred to as "GPC method") was $1.1 \times 10^4$.

A warm aqueous solution comprising 3.0 g of a basic dye (supplied by Hodogaya Kagaku), 100 g of water and 1.0 g of acetic acid was gradually added to 100 g of an aqueous 20% solution of the thus-obtained water-soluble polymer, and the mixture was stirred at 80° C. for 60 minutes. The mixture was concentrated under a reduced pressure by a rotary evaporator so that the volume was reduced to about ½. The concentrate was dropped into 2 l of ethanol, and the precipitated colored polymer was recovered by filtration using a glass filter and dried under a reduced pressure.

An ink was prepared by dissolving 2.5 g of the thus-obtained colored polymer powder and 10 g of tetraethylene glycol in 37.5 g of water. The properties of the ink were as shown in Table 1. The thus-prepared ink of the present invention could be filtered by Toyo Filter Paper No. 131 without clogging. When the ink was stored at 5°, 25° or 50° C. for 1 hour, the viscosity of the ink was not changed with the lapse of time and no precipitate was formed.

The thus-prepared ink of the present invention was coated on art paper by a 1-mil doctor blade and then dried at room temperature. When the light fastness was examined by a xenon arc fade-ometer, it was found that the sample had a good light fastness.

TABLE 1

| Example No. | Dye Used | Viscosity of Ink (cps, 25° C.) | Surface Tension of Ink (dyne/cm, 25° C.) |
|---|---|---|---|
| 4 | Cathilon Red GLH (C.I. Basic Red 38) | 3.4 | 58.4 |
| 5 | Cathilon Yellow GLH (C.I. Basic Yellow 14) | 3.7 | 58.0 |
| 6 | Cathilon Blue GLH (C.I. Basic Blue 65) | 3.6 | 59.2 |

When each of the inks was filtered by a membrane filter having a pore size of 0.45 μm and was jet-recorded on wood free paper at a granulation frequency of 100 KHz from a nozzle having an inner diameter of 50 μm, clear printed letters were obtained.

EXAMPLES 7 THROUGH 9

A polymerization flask, the inner atmosphere of which was substituted with nitrogen, was charged with 40 parts of water, and the temperature was elevated to 70° C. An aqueous monomer solution was prepared by dissolving 117 parts of sodium p-styrenesulfonate having a purity of 82.0% (Spinomar NaSS supplied by Toyo Soda) and 24 parts of acrylic acid in 400 parts of water. An aqueous solution of a polymerization initiator was prepared by dissolving 6 parts of ammonium persulfate in 20 parts of water. These aqueous solutions of the monomers and the polymerization initiator were added into the polymerization flask over a period of 3 hours and polymerization was carried out at 70° C. The mixture was stirred at 70° C. for 2 hours and cooled to 25° C. to obtain an aqueous polymer solution having a solution viscosity of 28 cps as measured at 25° C.

The aqueous polymer solution was dropped into acetone to effect purification and obtain a powder of a water-soluble polymer. From the analysis value of sulfur in the polymer, it was found that the sulfonic acid group was contained in an amount of $3.86 \times 10^{-3}$ gram-equivalent/g of the polymer. The average molecular weight $\overline{Mw}$ of the polymer as determined by the GPC method was $3.4 \times 10^4$.

An aqueous solution of a colored polymer obtained by treating an aqueous 20% solution of the thus-obtained water-soluble polymer in the same manner as in Examples 4 through 6 was dropped into 2 l of acetone, and the precipitated colored polymer was filtered by a glass filter and dried under a reduced pressure.

In 37 g of water were dissolved 1.0 g of the thus-obtained colored polymer powder and 12 g of diethylene glycol, and the pH value was adjusted to 6.5 by using ethanol amine to obtain an ink of the present invention.

The properties of the ink are as shown in Table 2. The ink of the present invention could be filtered by using Toyo Filter Paper No. 131 without clogging. When the ink was stored at 50° C. for 1 month, the viscosity was not changed with the lapse of time and no precipitate was observed.

The ink of the present invention was coated on art paper by a 1-mil doctor blade and dried at room temperature, and when the light fastness was tested by a xenon arc fade-ometer, it was found that the sample had a good light fastness.

TABLE 2

| Example No. | Dye Used | Viscosity of Ink (cps, 25° C.) | Surface Tension of Ink (dyne/cm, 25° C.) |
|---|---|---|---|
| 7 | Cathilon Yellow T-RLH | 6.7 | 57.0 |
| 8 | Cathilon Blue 5GLH | 5.8 | 56.8 |
| 9 | Methylene Blue FZ | 6.4 | 57.4 |

EXAMPLES 10 AND 11

A polymerization flask, the inner atmosphere of which was substituted with nitrogen, was charged with 50 parts of water, and the temperature was elevated to 90° C. An aqueous monomer solution was prepared by dissolving 20 parts of 2-hydroxyethyl methacrylate and 220 parts of sodium p-styrene-sulfonate having a purity of 82.0% (Spinomar NaSS supplied by Toyo Soda) in 700 parts of water. An aqueous solution of a polymerization initiator was prepared by dissolving 8 parts of ammonium persulfate in 30 parts of water.

These aqueous solutions of the monomers and the polymerization initiator were added into the polymerization flask over a period of 3 hours and polymerization was carried out at 90° C. Subsequently, polymerization was further conducted for 2 hours and the polymerization mixture was cooled to 25° C. to obtain an aqueous polymer solution having a solution viscosity of 18 cps as measured at 25° C. The aqueous polymer solution was treated with a large quantity of acetone to precipitate a polymer having an average molecular weight $\overline{Mw}$ of $7 \times 10^3$ as determined by the GPC method. From the analysis value of sulfur in the polymer, it was found that the sulfonic acid group was contained in the polymer at a concentration of $4.37 \times 10^{-3}$ gram-equivalent/g polymer.

An aqueous solution of a colored polymer obtained by treating an aqueous 20% solution of the thus-obtained water-soluble polymer in the same manner as in Examples 4 through 6 was dropped into a large quantity of acetone, and the precipitated colored polymer was recovered by filtration using a glass filter and then dried under a reduced pressure.

An ink was prepared by dissolving 4.0 g of the thus-obtained polymer powder and 10 g of diethylene glycol monobutyl ether in 36 g of water. The properties of the ink were as shown in Table 3. The ink could be filtered by Toyo Filter Paper No. 131 without clogging. When the ink was stored at 50° C. for 1 month, the viscosity was not changed with the lapse of time and no precipitate was observed.

The thus-obtained ink of the present invention was coated on art paper by a 1-mil doctor blade and dried at room temperature. When the light fastness was tested by a xenon arc fade-ometer, it was found that the sample had a good light fastness.

TABLE 3

| Example No. | Dye Used | Viscosity of Ink (cps, 25° C.) | Surface Tension of Ink (dyne/cm, 25° C.) |
|---|---|---|---|
| 10 | Cathilon Blue 5GLH | 4.2 | 46.3 |
| 11 | Cathilon Red 6BH | 5.0 | 48.0 |

When each of the inks of Examples 10 and 11 was filtered through a membrane filter having a pore size of 0.45 μm and jet-recorded on wood free paper at a granulation frequency of 100 KHz from a nozzle having an inner diameter of 50 μm, clear printed letters were obtained.

An aqueous 10% solution of the colored polymer powder obtained above was prepared, cast on a casting glass plate and then dried in a thermostat chamber maintained at 32°, 25°, 20° or 10° C. In each case, a transparent colored film was obtained.

EXAMPLES 12 THROUGH 14

A polymerization flask, the inner atmosphere of which was substituted with nitrogen, was charged with 40 parts of water and the temperature was elevated to 90° C. An aqueous monomer solution was prepared by dissolving 56 parts of sodium p-styrene-sulfonate having a purity of 81.0% (Spinomar NaSS supplied by Toyo Soda) and 116 parts of 2-hydroxyethyl methacrylate in 488 parts of water. An aqueous solution of a polymerization initiator was prepared by dissolving 3 parts of ammonium persulfate in 97 parts of water.

These aqueous solutions of the monomers and the polymerization initiator were added into the polymerization flask over a period of 3 hours and polymerization was carried out at 90° C. The polymerization was further conducted at 90° C. for 2 hours, and the polymerization mixture was cooled to room temperature to obtain an aqueous polymer solution having a solution viscosity of 32 cps as measured at 25° C.

The conversion of the monomers was 99.1% as determined by the measurement of the unreacted monomers by the bromine addition method. The average molecular weight $\overline{Mw}$ of the polymer was $3 \times 10^4$ as determined according to the GPC method.

The polymer was purified and the sulfonic acid group concentration was determined from the analysis value of sulfur. It was found that the sulfonic acid group was contained in the polymer at a concentration of $1.70 \times 10^{-3}$ gram-equivalent/g polymer.

A solution of 3 parts of a basic dye (supplied by Hodogaya Kagaku) and 1 part of acetic acid in 51 parts of water was added to 25 parts of the thus-obtained water-soluble polymer, and the mixture was stirred at 60° C. for 1 hour to form a colored polymer. The colored polymer was mixed with 20 parts of γ-butyrolactone to prepare an aqueous ink having properties shown in Table 4.

TABLE 4

| Example of No. | Dye Used | Viscosity Ink (cps) |
|---|---|---|
| 12 | Cathilon Yellow 3GLH (C.I. Basic Yellow 11) | 4.1 |
| 13 | Cathilon Brilliant Red 4GH (C.I. Basic Red 14) | 4.2 |
| 14 | Cathilon Pure Blue 5GH (C.I. Basic Blue 3) | 4.2 |

The aqueous inks obtained in Examples 12 through 14 were tested in the following manner.

Writing was performed on writing paper A of JIS P-3201 by using a sign pen filled with the aqueous ink, and after 1 minute, the writing paper was immersed in water for 1 hour and the state of the manuscript was examined. Any bleeding or contamination was hardly observed on the manuscript and the color value was not changed. The aqueous ink was coated on writing paper A of JIS P-3201 by using a 1-mil doctor blade, and the light fastness was tested by using a xenon fade-ometer (black panel temperature=65°±3° C., relative humidity of 35±5%) and compared with the discoloration degree of the blue scale of JIS L-0841. It was found that the light fastness of each of the aqueous inks was class 3 to 4 of the blue scale, though the light fastness of each of the dyes per se was class 1 of the blue scale.

EXAMPLES 15 THROUGH 17

A polymerization flask, the inner atmosphere of which was substituted with nitrogen, was charged with 50 parts of water, and the temperature was elevated to 90° C. An aqueous monomer solution was prepared by dissolving 73 parts of sodium p-styrene-sulfonate having a purity of 81.9% (Spinomar NaSS supplied by Toyo Soda), 122 parts of 2-hydroxyethyl methacrylate and 122 parts of 2-hydroxyethyl acrylate in 603 parts of water. An aqueous solution of a polymerization initiator was prepared by dissolving 24 parts of ammonium persulfate in 56 parts of water.

These aqueous solutions of the monomers and the polymerization initiator were added into the polymerization flask over a period of 3 hours and polymerization was carried out at 90° C. Then, the polymerization was further conducted at 90° C. for 2 hours and the polymerization mixture was cooled to room temperature to obtain an aqueous polymer solution having a solution viscosity of 255 cps as measured at 25° C.

The conversion of the monomers was 99.5% and the average molecular weight $\overline{Mw}$ was $1 \times 10^4$, as measured in the same manner as in Examples 12 through 14. In the polymer, the sulfonic acid group concentration was $9 \times 10^{-4}$ gram-equivalent/g polymer and the hydroxyl group concentration was $6.6 \times 10^{-3}$ gram-equivalent/g polymer.

To 10 part of the thus-obtained water-soluble polymer were added 2 parts of a basic dye (supplied by Nihon Kayaku), 1 part of acetic acid, 20 parts of N-methyl-2-pyrrolidone and 67 parts of water, and the mixture was stirred at 60° C. for 1 hour to obtain a colored polymer. An aqueous ink was prepared by adding 10 parts of ethylene glycol and 0.5 part of methyl p-hydroxybenzoate to the above mixture. The properties of the ink were as shown in Table 5.

TABLE 5

| Example No. | Dye Used | Viscosity of Ink (cps) |
|---|---|---|
| 15 | Kayacryl Blue GRL 300 (C.I. Basic Blue 41) | 3.1 |
| 16 | Kayacryl Red GRL 200 (C.I. Basic Red 46) | 3.2 |
| 17 | Kayacryl Yellow 3RL (C.I. Basic Yellow 67) | 2.8 |

The aqueous inks obtained in Examples 15 through 17 were subjected to the water resistance test in the same manner as in Examples 12 through 14. In each case, blurring or contamination of the manuscript was hardly observed and the color value was not changed. The light fastness of each aqueous ink was class 4.

EXAMPLES 18 THROUGH 20

A polymerization flask, the inner atmosphere of which was substituted with nitrogen, was charged with 50 parts of water, and the temperature was elevated to 90° C. An aqueous monomer solution was prepared by dissolving 117 parts of sodium p-styrene-sulfonate having a purity of 81.9% (Spinomar supplied by Toyo Soda), 106 parts of 2-hydroxyethyl methacrylate and 40 parts of acrylamide in 657 parts of water. An aqueous solution of a polymerization initiator was prepared by dissolving 19 parts of ammonium persulfate in 61 parts of water.

These aqueous solutions of the monomers and the polymerization initiator were added into the polymerization flask over a period of 3 hours and polymerization was carried out at 90° C. Then, the polymerization was further conducted at 90° C. for 2 hours and the polymerization mixture was cooled to room temperature to obtain an aqueous polymer solution having a solution viscosity of 65 cps as measured at 25° C.

The conversion of the monomers was 99.3% and the average molecular weight $\overline{Mw}$ was $1 \times 10^4$, as determined as in Examples 12 through 14. In the polymer, the sulfonic acid group concentration was $1.9 \times 10^{-3}$ gram-equivalent/g of the polymer and the hydroxyl group concentration was $3.4 \times 10^{-3}$ gram-equivalent/g polymer.

To 20 parts of the obtained water-soluble polymer were added 6 parts of a basic dye (supplied by Hodogaya Kagaku), 20 parts of N,N'-dimethylformamide and 53 parts of water, and the mixture was stirred at 60° C. for 1 hour to obtain a colored polymer. An aqueous ink was prepared by adding 15 parts of diethylene glycol to the mixture. The properties of the ink were as shown in Table 6.

TABLE 6

| Example No. | Dye Used | Viscosity of Ink (cps) |
|---|---|---|
| 18 | Cathilon Blue 5GLH (C.I. Basic Blue 45) | 3.5 |
| 19 | Cathilon Orange GLH (C.I. Basic Orange 21) | 3.6 |
| 20 | Cathilon Red GLH (C.I. Basic Red 38) | 3.4 |

The aqueous inks obtained in Examples 18 through 20 were subjected to the water resistance test in the same manner as in Examples 12 through 14. Blurring or contamination of the manuscript was hardly caused and the color value was not changed. The light fastness of each aqueous ink was class 4.

EXAMPLES 21 THROUGH 23

To 50 parts of the water-soluble polymer used in Examples 15 through 17 were added 10 parts of a basic dye (supplied by Hodogaya Kagaku) and 40 parts of water, and the mixture was stirred at 60° C. for 1 hour to form a colored polymer. Then, 30 parts of γ-butyrolactone was added to the mixture to obtain an aqueous ink having properties shown in Table 7.

TABLE 7

| Example No. | Dye Used | Viscosity of Ink (cps) |
|---|---|---|
| 21 | Cathilon Yellow 3GLH (C.I. Basic Yellow 11) | 13.1 |
| 22 | Cathilon Brilliant Red 4GH (C.I. Basic Red 14) | 13.5 |
| 23 | Cathilon Pure Blue 5GH (C.I. Basic Blue 3) | 13.2 |

The water resistance and light fastness of the aqueous inks obtained in Examples 21 through 23 were similar to those of the inks obtained in Examples 12 through 14. Each of the inks obtained in Examples 21 through 23 was in the form of a homogeneous solution. In contrast, inks prepared by using the above basic dyes without using the aqueous polymer contained large quantities of insoluble matters of the basic dyes and they could not be formed into homogeneous aqueous solutions.

EXAMPLE 24

A separable flask, the inner atmosphere of which was substituted with nitrogen, was charged with 0.35 part of NaHSO$_3$, 0.07 part of a surface-active agent (Emulgen 935 supplied by Kao-Atlas), 0.07 part of another surface active agent (Emulgen 920 supplied by Kao-Atlas) and 46.2 parts of water, and the temperature was elevated to 40° C. with stirring in a nitrogen current. A liquid monomer mixture comprising 50 parts of styrene and 50 parts of n-butyl acrylate, an aqueous solution of 2.5 parts of sodium p-styrene-sulfonate in 47.5 parts of water and an aqueous solution of 0.5 part of ammonium persulfate in 49.5 parts of water were added into the flask over a period of 3 hours and polymerization was carried out at 40° C. After completion of the addition, the polymerization temperature was maintained for 3 hours.

The average particle size of the polymer in the obtained polymer emulsion was about 0.12 μm. In the polymer, the sulfonic acid salt group was contained at a concentration of $1.2\times10^{-4}$ gram-equivalent/g polymer. The non-volatile component content of the polymer emulsion at 110° C. was 41.0%.

To 100 parts as the resin of the obtained polymer emulsion were added 1.0 part of a basic dye (Cathilon Blue 5GLH, Cathilon Yellow T-RLH or Methylene Blue FZ supplied by Hodogaya Kagaku), 10 parts of water and 1 part of acetic acid, and the mixture was stirred at 98° C. for 60 minutes and then cooled to room temperature. A part of the resulting colored polymer emulsion was cast on a casting glass plate and dried at room temperature. A transparent, clear and soft colored film was obtained in each case.

When a cut piece of the dried film was immersed in a 1/1 liquid mixture of acetone/water for 1 week, dissolution of the dye was not observed. When the light fastness of the film was examined by a fade-ometer, it was found that the film had an excellent light fastness.

EXAMPLE 25

A polymer emulsion was prepared in the same manner as described in Example 24 except that a liquid monomer mixture comprising 30 parts of styrene, 69 parts of n-butyl acrylate and 1 part of acrylic acid was used instead of the liquid monomer mixture used in Example 24.

The average particle size of the polymer in the polymer emulsion was 0.08 μm. In the polymer, the sulfonic acid group concentration was $1.1\times10^{-4}$ gram-equivalent/g polymer. The non-volatile component content in the polymer emulsion at 110° C. was 40.8%.

To 100 parts as the resin of the obtained polymer emulsion were added 1.0 part of a basic dye (Cathilon Red 6BH or Cathilon Blue GLH supplied by Hodogaya Kagaku), 10 parts of water and 1.0 part of acetic acid, and the mixture was stirred at 95° C. for 90 minutes and then cooled to room temperature.

When the polymer emulsion was dried at room temperature, a transparent clear colored film was obtained. When the film was immersed in a 1/1 liquid mixture of acetone/water for 1 week, dissolution of the dye was not observed. The light fastness of the film was as excellent as that of the film obtained in Example 24.

EXAMPLE 26

A separable flask, the inner atmosphere of which was substituted with nitrogen, was charged with 0.3 part of NaHSO$_3$, 0.5 part of a surface active agent (Emulgen 935 supplied by Kao-Atlas) and 47 parts of water, and the temperature was elevated to 40° C. with stirring in a nitrogen current. A liquid monomer mixture comprising 30 parts of methyl methacrylate, 70 parts of ethyl acrylate and 0.5 part of acrylic acid, an aqueous solution of 3.0 parts of potassium p-styrene-sulfonate in 47 parts of water and an aqueous solution of 0.5 part of ammonium persulfate in 49.5 parts of water were added into the flask over a period of 3 hours and polymerization was carried out at 40° C. After completion of the addition, the polymerization temperature was maintained for 2 hours. The average particle size of the polymer in the obtained polymer emulsion was 0.08 μm, and the non-volatile component content at 110° C. was 41.3%. In the polymer, the sulfonate acid salt group was contained at a concentration of $1.4\times10^{-4}$ gram-equivalent/g polymer.

To 100 parts as the resin of the obtained polymer emulsion were added 1.0 part of a basic dye (Cathilon Yellow 3GLH or Cathilon Red GLH supplied by Hodogaya Kagaku), 10 parts of water and 1 part of acetic acid, and the mixture was stirred at 95° C. for 60 minutes and cooled to room temperature.

In the same manner as described in Example 24, the obtained colored polymer emulsion was cast on a casting glass sheet and dried at room temperature. A transparent flexible colored film was obtained. When a cut piece of the dried film was immersed in a 1/1 liquid mixture of acetone/water for 1 week, dissolution of the dye was not observed. The film had a light fastness as good as that of the film obtained in Example 24.

To 50 parts of the colored polymer emulsion was added 20 parts of an aqueous 50% slurry of a white pigment (Titanium White R550 supplied by Ishihara Sangyo) to obtain a paint. When the resulting emulsion paint was brush-coated on a flexible plate (JIS A-5403) and dried for 3 days, a colored coating was obtained. The light fastness was as good as the light fastness observed in Example 24.

EXAMPLE 27

A separable flask, the inner atmosphere of which was substituted with nitrogen was charged with 0.3 part of NaHSO$_3$, 0.8 part of a surface-active agent (Emulgen NC supplied by Kao-Atlas) and 47 parts of water, and the temperature was elevated to 40° C. with stirring in a nitrogen current. A liquid monomer mixture comprising parts of methyl methacrylate, 3 parts of 2-hydroxyethyl methacrylate and 67 parts of butyl acrylate, an aqueous solution of 3.0 parts of sodium p-styrene-sulfonate in 47 parts of water and an aqueous solution of 0.5 part of potassium persulfate in 49.5 parts of water were added into the flask over a period of 3 hours and polymerization was carried out at 40° C. After completion of the addition, the polymerization temperature was maintained for 3 hours.

The average particle size of the polymer in the obtained polymer emulsion was about 0.10 μm, and the non-volatile matter content at 110° C. was 41.2%. In the polymer, the sulfonic acid salt group was contained at a concentration of $1.5\times10^{-4}$ gram-equivalent/g polymer.

To 100 parts as the resin of the obtained polymer emulsion were added 1.0 part of a basic dye (Cathilon Red GLH or Cathilon Yellow 3GLH supplied by Hodogaya Kagaku), 10 parts of water and 1 part of acetic acid. The mixture was stirred at 95° C. for 90 minutes and cooled to room temperature. When a part of the obtained emulsion was dried at room temperature, a transparent, clear and soft colored film was obtained.

When a cut piece of the dried film was immersed in a 1/1 liquid mixture of acetone/water for 1 week, dissolution of the dye was not observed. The light fastness of the film was as good as that of the film obtained in Example 24.

EXAMPLE 28

A 500-ml flask, the inner atmosphere of which was substituted with nitrogen, was charged with 0.5 g of a surface active agent (Emulgen NC supplied by Kao-Atlas) and 65 g of water, and the temperature was elevated to 60° C. with stirring in a nitrogen current. A liquid monomer mixture comprising 40 g of styrene and 60 g of n-butyl acrylate, an aqueous solution of 3.7 g of sodium p-styrene-sulfonate having a purity of 82.0% (Spinomar NaSS supplied by Toyo Soda) in 75 g of water and an aqueous solution of a polymerization initiator formed by dissolving 0.5 g of ammonium persulfate in 40 g of water were added into the flask over a period of 3 hours and polymerization was carried out at 60° C. After completion of the addition, the polymerization temperature was maintained for 3 hours and the polymerization mixture was then cooled to room temperature.

In the obtained polymer emulsion, the non-volatile matter content at 110° C. was 37.0% and the average particle size of the polymer was about 0.10 μm. In the polymer, the sulfonic acid group was contained at a concentration of $1.4 \times 10^{-4}$ gram-equivalent/g of the polymer.

The obtained polymer was divided into several parts and dyed with dyes described below. Namely, 3 parts of a dye, 10 parts of water and 1 part of an aqueous 30% solution of acetic acid were added to 100 parts as the resin of the polymer emulsion. The mixture was stirred at 80° to 85° C. for 1 hour and then cooled to room temperature.

The used dyes were Cathilon Blue 5GLH (C.I. Basic Blue 45), Cathilon Orange GLH (C.I. Basic Orange 21) and Cathilon Red GLH (C.I. Basic Red 38), each being supplied by Hodogaya Kagaku.

A part of the thus-obtained colored polymer emulsion was subjected to the filtration test using an ultrafilter membrane having a fractionation molecular weight of 50,000 (supplied by Toyo Soda) under a pressure of 2 kg/cm² (gauge pressure). In each case, dissolution of the dye into the filtrate was not observed. When a part of the colored polymer emulsion was cast on a casting glass plate and allowed to stand in a thermostat chamber maintained at 25° C., a transparent, clear and soft colored film was obtained in each case. When the film-forming temperature of the colored polymer emulsion was measured, it was found that the film-forming temperature was about 12° C.

Letters could be written on art paper, Kent paper, wood free paper and kraft with a felt pen impregnated with the thus-obtained colored polymer emulsion. The written letters after drying showed an excellent water resistance, and blurring of the ink with water or disappearance of the ink by immersion in water was not observed at all.

The light fastness of each of the above dyes was class 1 or lower of the blue scale, but the light fastness of each of the colored polymer emulsions was class 3 or 4 of the blue scale.

EXAMPLE 29

A 500-ml flask, the inner atmosphere of which was substituted with nitrogen, was charged with 0.07 g of a surface active agent (Emulgen 935 supplied by Kao-Atlas), 0.07 g of another surface active agent (Emulgen 920 supplied by Kao-Atlas), 0.3 g of sodium hydrogensulfite and 46.2 g of water, and the temperature was elevated to 40° C. with stirring in a nitrogen current. A liquid monomer mixture comprising 50 g of styrene, 50 g of n-butyl acrylate and 1 g of methacrylic acid, an aqueous solution of 4.9 g of sodium p-styrene-sulfonate having a purity of 82.0% (Spinomar NaSS supplied by Toyo Soda) in 45.1 g of water and an aqueous solution of a polymerization initiator formed by dissolving 0.5 g of ammonium persulfate in 49.5 g of water were added into the flask over a period of 3 hours and polymerization was carried out at 40° C. After completion of the addition, the polymerization temperature was maintained for 3 hours and the polymerization mixture was then cooled to room temperature.

In the obtained polymer emulsion, the non-volatile matter content at 110° C. was 41.1%, and the average particle size of the polymer was about 0.11 μm. In the polymer, the sulfonic acid group was contained at a concentration of $1.8 \times 10^{-4}$ gram-equivalent/g polymer.

The obtained polymer emulsion was divided into several parts and dyed with dyes described below. Namely, 3 parts of a dye, 10 parts of water and 1 part of an aqueous 30% solution of acetic acid were added to 100 parts as the resin of the polymer emulsion, and the mixture was stirred at 80° to 85° C. for 1 hour and cooled to room temperature.

The dyes used were Cathilon Brilliant Pink BGH (C.I. Basic Red 27), Cathilon Red 6BH (C.I. Basic Violet 7), Cathilon Violet 3BLH (C.I. Basic Violet 28) and Cathilon Yellow GLH (C.I. Basic Yellow 14), each being supplied by Hodogaya Kagaku.

When a part of the thus-obtained colored polymer emulsion was subjected to the filtration test using an ultrafilter membrane having a fractionation molecular weight of 50,000 (supplied by Toyo Soda) under a pressure of 2 kg/cm² (gauge pressure), dissolution of the dye was not observed. When a part of the colored polymer emulsion was cast on a casting glass sheet and allowed to stand in a thermostat chamber maintained at 25° C., a transparent, clear and pliable colored film was obtained in each case. When the film-forming temperature of the colored polymer emulsion was measured, it was found that the lowest film-forming temperature was about 22° C.

A felt pen prepared by using the thus-obtained colored polymer emulsion in the same manner as in Example 28 could write letters in a good condition without blurring or clogging. Letters written on art paper after drying showed an excellent water resistance, and when the written paper was immersed in city water, blurring of the ink or dissolution of the ink was not observed.

The light fastness of the ink coated and dried on art paper was class 4 or 5 of the blue scale. Incidentally, the light fastness of each of the dyes was class 1 of the blue scale or lower.

EXAMPLE 30

A polymer emulsion was prepared in the same manner as described in Example 29 except that a liquid monomer mixture comprising 30 g of styrene, 50 g of n-butyl acrylate and 20 g of n-butyl methacrylate was used instead of the liquid monomer mixture used in

Example 29

In the obtained polymer emulsion, the non-volatile component content at 110° C. was 40.8%, and the average particle size of the polymer was about 0.08 μm. In the polymer, the sulfonic acid group was contained at a concentration of $1.9 \times 10^{-4}$ gram-quivalent/g polymer.

A colored polymer emulsion was prepared by treating the obtained polymer emulsion in the same manner as in Example 29. Dissolution of the dye was not observed at the ultrafiltration test. The lowest film-forming temperature of the colored polymer emulsion was about 10° C.

A felt pen was prepared by using the thus-obtained colored polymer emulsion in the same manner as in Example 29. This felt pen had a high quality. Letters written on art paper after drying had an excellent water resistance, and when the art paper was immersed in city water, blurring or dissolution of the ink was not observed. The light fastness of the ink coated on art paper was class 4 or 5 of the blue scale.

EXAMPLE 31

A monomer pre-emulsion was prepared by dissolving 3.5 g of Emulgen 935 in 75 g of water, adding 35 g of mthyl methacrylate, 60 g of ethyl acrylate, 5 g of 2-hydroxyethyl acrylate and 0.5 g of sodium hydrogensulfite to the solution and treating the mixture with a homogenizer. A 500-ml flask, the inner atmosphere of which was substituted with nitrogen, was charged with 50 g of the pre-emulsion, and the temperature was elevated to 40° C. with stirring in a nitrogen current. The remainder of the pre-emulsion, an aqueous solution of 3.5 g of potassium p-styrene-sulfonate in 30 g of water and an aqueous solution of a polymerization initiator formed by dissolving 0.5 g of potassium persulfate in 30 g of water were added into the flask over a period of 4 hours and polymerization was carried out at 40° C. After completion of the addition, the polymerization temperature was maintained for 3 hours and then the polymerization mixture was cooled to room temperature.

In the obtained polymer emulsion, the non-volatile matter content at 110° C. was 41.3%, and the average particle size of the polymer was about 0.08 μm. In the polymer, the sulfonic acid group was contained at a concentration of $1.5 \times 10^{-4}$ gram-equivalent/g polymer.

The obtained polymer emulsion was divided into several parts and dyed with dyes described below. Namely, 3 parts of a dye, 10 parts of water and 1 part of an aqueous 30% solution of acetic acid were added to 100 parts as the resin of the polymer emulsion, and the mixture was stirred at 80° to 85° C. for 1 hour and then cooled to room temperature.

The dyes used were Aizen Malachite Green (C.I. Basic Green 4), Cathilon Blue CD-F2RLH (C.I. Basic Blue 129), Cathilon Brilliant Pink BH (C.I. Basic Red 36) and Cathilon Yellow RLH 200% (C.I. Basic Yellow 73), each being supplied by Hodogaya Kagaku.

A part of the thus-obtained colored polymer emulsion was subjected to the filtration test using an ultrafiltration membrane having a fractionation molecular weight of 50,000 (supplied by Toyo Soda) at a pressure of 2 kg/cm² (gauge pressure), with respect to each colored emulsion, dissolution of the dye into the filtrate was not observed.

When a part of the colored polymer emulsion was cast on a casting glass plate and allowed to stand still in a thermostat chamber maintained at 25° C., a transparent, clear and soft colored film was obtained in each case. The lowest film-forming temperature of the colored polymer emulsion was about 8° C.

Letters could be written on art paper, Kent paper and wood free paper with a felt pen impregnated with the thus-obtained colored polymer emulsion, and the letters after drying showed an excellent water resistance and blurring of the ink with water or dissolution of the ink by immersion in water was not observed at all.

The light fastness of each of the dyes was class 1 of the blue scale or lower, but each colored polymer emulsion had a light fastness of class 4 or 5 of the blue scale.

EXAMPLE 32

A 500-ml flask, the inner atmosphere of which was substituted with nitrogen, was charged with 2.0 g of Emulgen 935, 0.5 g of Emulgen NC and 47 g of water, and the temperature was elevated to 60° C. with stirring in a nitrogen current. A liquid monomer mixture comprising 80 g of ethyl acrylate and 20 g of methyl methacrylate, an aqueous solution formed by diluting 7 g of an aqueous 30% solution of sodium vinyl-sulfonate (supplied by Hoechst) with 43 g of water and an aqueous solution of a polymerization initiator formed by dissolving 0.5 g of ammonium persulfate in 49.5 g of water were added into the flask over a period of 5 hours and polymerization was carried out at 60° C. After completion of the addition, the polymerization temperature was maintained for 3 hours and then the polymerization mixture was cooled to room temperature.

In the obtained polymer emulsion, the non-volatile matter content was 41.1% at 110° C., and the average particle size of the polymer was about 0.10 μm. In the polymer, the sulfonic acid group was contained at a concentration of $1.4 \times 10^{-4}$ gram-equivalent/g polymer.

The thus-obtained polymer emulsion was divided into several parts and treated in the same manner as described in Example 28 by using the dyes used in Example 28 to obtain colored ploymer emulsions. When a part of each colored polymer emulsion was subjected to the filtration test by using an ultrafiltration membrane having a fractionation molecular weight of 50,000 (supplied by Toyo Soda) under a pressure of 2 kg/cm² (gauge pressure), dissolution of the dye into the filtrate was not observed.

When a part of the colored polymer emulsion was cast on a casting glass plate and allowed to stand still in a thermostat chamber maintained at 25° C., a transparent, clear and pliable colored film was obtained in each case. The lowest film-forming temperature of the colored polymer emulsion was found to be about 4° C.

Letters could be written on art paper, Kent paper, wood free paper and kraft paper with a felt pen impregnated with the colored polymer emulsion. Upon immersion of the written papers after drying in city water, blurring of the ink with water or dissolution of the ink into water was not observed, and the written letters showed an excellent water resistance. The light fastness of a film from the above emulsion was class 3 to 4 of the blue scale.

EXAMPLE 33

A polymer emulsion was prepared in the same manner as in Example 32 except that 100 g of ethyl acrylate was used as the monomer component. In the obtained polymer emulsion, the non-volatile component content at 110° C. was 39.5%, and the average particle size of the polymer was about 0.06 $\mu$m. In the polymer, the sulfonic acid group was contained at a concentration of $1.4 \times 10^{-4}$ gram-equivalent/g polymer.

The obtained polymer emulsion was divided into several parts and treated in the same manner as in Example 28 by using the dyes used in Example 28 to obtain colored polymer emulsions. When the colored polymer emulsions were subjected to the filtration test by using an ultrafiltration membrane having a fractionation molecular weight of 50,000 (supplied by Toyo Soda) under a pressure of 2 kg/cm$^2$ (gauge pressure), in each emulsion, dissolution of the dye into the filtrate was not observed.

When a part of the colored polymer emulsion was cast on a casting glass plate and allowed to stand still in a thermostat chamber maintained at 25° C., a transparent, clear and pliable colored film was obtained in each case. The lowest film-forming temperature of the colored polymer emulsion was found to be lower than 4° C.

Letters could be written on art paper, Kent paper, wood free paper and kraft paper with a felt pen impregnated with the thus-obtained colored polymer emulsion. When the written paper was immersed in city water, blurring of the ink with water or dissolution of the ink into water was not observed at all, and the letters had an excellent water resistance. The light fastness of a film from the above emulsion was class 3 to 4 of the blue scale.

EXAMPLE 34

A 500-ml flask, the inner atmosphere of which was substituted with nitrogen was charged with 2 g of Emulgen 935, 0.3 g of sodium hydrogensulfite and 47 g of water, and the temperature was elevated to 40° C. with stirring in a nitrogen current. A liquid monomer mixture comprising 30 g of acrylonitrile and 70 g of n-butyl acrylate, an aqueous solution of 4.9 g of sodium p-styrene-sulfonate having a purity of 82.0% (Spinomar NaSS supplied by Toyo Soda) in 45.1 g of water and an aqueous solution of a polymerization initiator formed by dissolving 0.5 g of ammonium persulfate in 49.5 g of water were added into the flask over a period of 4 hours and polymerization was carried out at 40° C. After completion of the addition, the polymerization temperature was maintained for 3 hours and then the polymerization mixture was cooled to room temperature. In the obtained polymer emulsion, the non-volatile matter content at 110° C. was 41.9%, and the average particle size of the polymer was about 0.14 $\mu$m. In the polymer, the sulfonic acid group was contained at a concentration of $1.8 \times 10^{-4}$ gram-equivalent/g polymer.

The obtained colored emulsion was divided into several parts and dyed in the same manner as in Example 29 with the dyes used in Exaple 29. When the obtained colored polymer emulsions were subjected to the filtration test by using an ultrafiltration membrane having a fractionation molecular weight of 50,000 (supplied by Toyo Soda) under a pressure of 2 kg/cm$^2$ (gauge pressure), dissolution of the dyes into the filtrate was not observed. When a part of the colored polymer emulsion was cast on a casting glass plate and allowed to stand still in a thermostat chamber maintained at 25° C., a transparent, clear and pliable colored film was obtained in each case. The lowest film-forming temperature of the colored polymer emulsion was about 22° C.

A good felt pen having no blurring or no clogging was obtained by using the thus-obtained colored polymer emulsion in the same manner as in Example 28. Letters written on art paper, Kent paper, wood free paper or kraft paper had an excellent water resistance and in immersion in city water, blurring of the ink or dissolution of the ink was not observed at all. The light fastness of the ink coated on art paper was class 4 to 5 of the blue scale.

EXAMPLE 35

A 500-ml flask, the inner atmosphere of which was substituted with nitrogen, was charged with 3 g of Emulgen 935, 0.5 g of sodium metabisulfite, 47 g of water, 2.0 g of Cathilon Blue CD-RLH (C.I. Basic Blue 67 supplied by Hodogaya Kagaku) and 0.3 g of potassium dihydrogenphosphate, and the temperature was elevated to 40° C. with stirring in a nitrogen current.

A liquid monomer mixture comprising 30 g of methyl methacrylate and 70 g of n-butyl acrylate, an aqueous solution of 4.9 g of sodium p-styrene-sulfonate having a purity of 82.0% (Spinomar NaSS supplied by Toyo Soda) in 45.1 g of water and an aqueous solution of a polymerization initiator formed by dissolving 0.5 g of t-butyl hydroperoxide in 49.5 g of water were added into the flask over a period of 4 hours and polymerization was carried out at 40° C. After completion of the addition, the polymerization temperature was maintained for 3 hours and then the polymerization mixture was cooled to room temperature.

In the obtained colored polymer emulsion, the non-volatile matter content at 110° C. was 40.8%, and the average particle size of the polymer was about 0.12 $\mu$m. In the polymer, the sulfonic acid group was contained at a concentration of $1.6 \times 10^{-4}$ gram-equivalent/g polymer.

A part of the thus-obtained colored polymer emulsion was subjected to the filtration test by using the ultrafiltration membrane used in Example 28. The filtrate was colored only slightly. When the colored polymer emulsion was cast on a casting glass sheet and allowed to stand still in a thermostat chamber maintained at 25° C., a transparent, clear and soft colored film was obtained. The lowest film-forming temperature of the colored polymer emulsion was found to be about 20° C.

When a felt pen was prepared by using the thus-obtained colored polymer emulsion in the same manner as in Example 28, a good felt pen having no blurring or clogging was obtained. Letters written on art paper, Kent paper or wood free paper showed an excellent water resistance after drying, and in immersion in city water, blurring of the ink or dissolution of the ink was not observed at all. The light fastness of the ink coated on art paper was class 4 of the blue scale.

COMPARATIVE EXAMPLE 1

A polymer emulsion was prepared in the same manner as in Example 28 except that a liquid monomer mixture comprising 65 g of styrene and 35 g of n-butyl acrylate was used instead of the liquid monomer mixture used in Example 28. In the obtained polymer emulsion, the non-volatile component content at 110° C. was 37.3%, and the average particle size of the polymer was about 0.15 μm. In the polymer, the sulfonic acid group was contained at a concentration of $1.3 \times 10^{-4}$ gram-equivalent/g polymer.

From this polymer emulsion, a colored polymer emulsion was prepared in the same manner as in Example 28. When the colored polymer emulsion was cast on a casting glass plate and allowed to stand in a thermostat chamber maintained at 35° C., a colored polymer was obtained but a uniform film was not obtained. Incidentally, the lowest film-forming temperature of the colored polymer emulsion was found to be about 48° C.

COMPARATIVE EXAMPLE 2

A polymer emulsion was prepared in the same manner as in Example 32 except that a liquid monomer mixture comprising 70 g of methyl methacrylate and 30 g of ethyl acrylate was used instead of the liquid monomer mixture used in Example 32. In the obtained polymer emulsion, the non-volatile matter content at 110° C. was 41.2%, and the average particle size of the polymer was 0.10 μm. In the polymer, the sulfonic acid group was contained at a concentration of $1.4 \times 10^{-4}$ gram-equivalent/g polymer.

From the thus-obtained polymer emulsion, a colored polymer emulsion was prepared in the same manner as in Example 32. When the colored polymer emulsion was cast on a casting glass plate and allowed to stand in a thermostat chamber maintained at 35° C., a colored polymer was obtained but a uniform film was not obtained. Incidentally, the lowest film-forming temperature of the colored polymer emulsion was 44° C.

EXAMPLE 36

A 500-ml flask, the inner atmosphere of which was substituted with nitrogen, was charged with 1.0 g of Emulgen 20C (supplied by Kao-Atlas) and 65 g of water, and the temperature was elevated to 60° C. with stirring in a nitrogen current. A liquid monomer mixture comprising 40.5 g of styrene and 63.5 g of n-butyl acrylate, an aqueous solution of 3.7 g of sodium p-styrene-sulfonate having a purity of 82.0% (Spinomar NaSS supplied by Toyo Soda) in 75 g of water and an aqueous solution of a polymerization initiator formed by dissolving 0.5 g of ammonium persulfate in 40 g of water were added into the flask over a period of 3 hours and polymerization was carried out at 60° C. After completion of the addition, the polymerization temperature was maintained for 2 hours.

In the obtained polymer emulsion, the average particle size of the polymer was about 0.10 μm. In the polymer, the sulfonic acid group was contained at a concentration of $1.4 \times 10^{-4}$ gram-equivalent/g polymer. The non-volatile matter content of the polymer emulsion at 110° C. was 37.0%.

To 100 parts as the solid of the obtained polymer emulsion were added 1.5 part of a basic dye (Cathilon Blue 5GLH, Cathilon Yellow TRLH, Methylene Blue FZ or Methyl Violet Pure, supplied by Hodogaya Kagaku), 10 parts of water and 1.0 part of an aqueous 50% solution of acetic acid, and the mixture was stirred at 95° to 98° C. for 1 hour and cooled to room temperature.

A part of the thus-obtained colored polymer emulsion was cast on a casting glass plate and allowed to stand in a thermostat chamber maintained at 25° C. A transparent, clear and pliable colored film was obtained.

Letters could be written on art paper, Kent paper or kraft paper with a felt pen impregnated with the thus-obtained colored polymer emulsion. The dried letters had an excellent water resistance, and blurring of the ink or dissolution of the ink by immersion in water was not observed at all. The light fastness of each of the dyes was class 1 of the blue scale or lower, but the light fastness of each of the colored polymer emulsions was class 3 to 4 of the blue scale.

EXAMPLE 37

A 500-ml flask, the inner atmosphere of which was substituted with nitrogen, was charged with 0.3 g of NaHSO$_3$, 0.07 g of Emulgen 935 (polyoxyethylene nonylphenol ether supplied by Kao-Atlas), 0.07 g of Emulgen 920 (p;olyoxyethylene nonylphenol ether supplied by Kao-Atlas) and 46.2 g of water, and the temperature was elevated to 40° C. in a nitrogen current. A liquid monomer mixture comprising 50 g of styrene, 50 g of n-butyl acrylate and 1 g of methacrylic acid, an aqueous solution of 2.5 g of sodium p-styrene-sulfonate having a purity of 82.0% (Spinomar NaSS supplied by Toyo Soda) in 47.5 g of water and an aqueous solution of 0.5 g of ammonium persulfate in 49.5 g of water were added into the flask over a period of 3 hours and polymerization was carried out at 40° C. After completion of the addition, the polymerization temperature was maintained for 3 hours.

In the obtained polymer emulsion, the average particle size of the polymer was about 0.11 μm. In the polymer, the sulfonic acid group was contained at a concentration of $12. \times 10^{-4}$ gram-equivalent/g polymer. The non-volatile component content of the polymer emulsion at 110° C. was 41.1%.

To 100 parts as the resin of the polymer emulsion were added 1.0 part of a basic dye (Cathilon Red GLH, Cathilon Red 6BH or Cathilon Yellow GLH, supplied by Hodogaya Kagaku), 10 parts of water and 1 part of acetic acid, and the mixture was stirred at 98° C. for 60 minutes and cooled to room temperature.

When a part of the obtained colored polymer emulsion was cast on a casting glass plate and allowed to stand still at room temperature (28° C.), a transparent, clear and pliable colored film was obtained with respect to each die.

When a felt pen was prepared by using the colored polymer emulsion in the same manner as in Example 36, a good felt pen having no blurring or no clogging was obtained. Dried letters showed a good water resistance, and in immersion in city water, blurring or dissolution was not observed. The light fastness of the colored polymer emulsion was class 4 to 5 of the blue scale, though the light fastness of each of the dyes per se was lower than class 1 of the blue scale.

EXAMPLE 38

A flask, the inner atmosphere of which was substituted with nitrogen, was charged with 0.3 g of NaHSO$_3$, 1.0 g of Emulgen 935 (polyoxyethylene nonylphenol ether supplied by Kao-Atlas) and 47 g of water, and the temperature was elevated to 40° C. in a nitrogen current. A liquid monomer mixture comprising 35 g of methyl methacrylate, 65 g of ethyl acrylate and 1.0 g of acrylic acid, an aquous solution of 3.0 g of potassium p-styrenesulfonate in 47 g of water and an aqueous solution of 0.5 g of potassium persulfate in 49.5 g of water were added into the flask over a period of 3 hours and polymerization was carried out at 40° C. After completion of the addition, the polymerization temperature was maintained for 2 hours.

In the obtained polymer emulsion, the average particle size of the polymer particles was 0.08 μm, and the non-volatile component content at 110° C. was 41.2%. In the polymer, the sulfonic acid group was contained at a concentration of $1.4 \times 10^{-4}$ gram-equivalent/g polymer.

To 100 parts as the resin of the obtained polymer emulsion were added 2.0 parts of a basic dye (Cathilon Yellow 3GLH, Cathilon Red GLH or Malachite Green, supplied by Hodogaya Kagaku), 20 parts of water and 0.5 part of acetic acid, and dyeing was carried out at 95° to 98° C. for 60 minutes and the mixture was cooled to room temperature.

In the same manner as in Example 36, the colored polymer emulsion was cast on a casting glass plate and allowed to stand still at room temperature. A transparent, clear and pliable colored film was obtained with respect to each dye. When a cut piece of the film was immersed in a 1/1 liquid mixture of acetone/water for 1 week, dissolution of the dye from the film was not observed.

Letters could be written on paper, cloth or board with a felt pen impregnated with the colored polymer emulsion. The light fastness of each of the colored emulsions was class 3 to 5 of the blue scale, though the light fastness of each of the dyes was lower than class 1 of the blue scale.

EXAMPLE 39 THROUGH 41

A polymerization flask, the inner atmosphere of which was substituted with nitrogen, was charged with 0.5 g of Emulgen NC (sodium polyoxyethylene alkylphenol ether sulfate supplied by Kao-Atlas) and 65 g of water, and the temperature was elevated to 60° C. with stirring in a nitrogen current. A liquid monomer mixture comprising 40 g of styrene, 63 g of n-butyl acrylate and 1.0 g of acrylic acid, an aqueous solution of 4.0 g of sodium p-styrene-sulfonate having a purity of 82.0% (Spinomar NaSS supplied by Toyo Soda) in 75 g of water and an aqueous solution of a polymerization initiator formed by dissolving 0.5 g of potassium persulfate in 40 g of water were added into the polymerization flask over a period of 3 hours and polymerization was carried out at 60° C. After completion of the addition, the polymerization was further conducted at 60° C. for 2 hours.

In the obtained polymer emulsion, the average particle size of the polymer particles was about 0.08 μm. From the result of the determination of sulfur in the polymer, it was found that in the polymer, the sulfonic acid group was contained at a concentration of $1.4 \times 10^{-4}$ gram-equivalent/g polymer. The non-volatile matter content in the polymer emulsion at 110° C. was 37.2%.

Then, about 50 g of the obtained polymer emulsion was diluted with about 300 ml of water and distillation was carried out under a reduced pressure by a rotary evaporator to remove the trace of the unreacted monomers, whereby 100 g of an emulsion having a solid content of 10.0% was obtained.

To this emulsion were added 0.3 g of a basic dye (supplied by Hodogaya Kagaku) shown in Table 8 and 10 g of an aqueous 20% solution of acetic acid. The temperature was elevated with stirring, and the mixture was stirred at 95° to 97° C. for 60 minutes. The mixture was cooled to room temperature, and the mixture was subjected to the filtration test by using an ultrafiltration membrane (TS-100 supplied by Toyo Soda) under a pressure of 2 kg/cm² (gauge pressure). It was confirmed that inorganic ions were completely removed.

The solid content of the obtained colored liquid was adjusted to 10% again to obtain an ink of the present invention. When the ink was filtered through Toyo Filter Paper No. 131, clogging was not caused at all. When the ink was stored at 5° C., 25° C. or 50° C. for 1 month, the viscosity was not changed with the lapse of time and no precipitate was formed.

The ink of the present invention was coated on art paper by a 1-mil doctor blade and dried at room temperature. When the light fastness was examined by using a xenon arc fade-ometer, it was found that the ink had a good light fastness. When this sample was immersed in water, bleeding or dissolution of the ink was not observed at all. The properties of the ink were as shown in Table 8.

Furthermore, each of the inks obtained in Examples 39 through 41 was filtered through a membrane filter having a pore size of 0.45 μm and jet-recorded on wood free paper from a nozzle having an inner diameter of 50 μm at a granulation frequency of 100 KHz. Clear printed letters were obtained. When the recording paper was imersed in city water, blurring of the ink was not observed at all.

TABLE 8

| Example No. | Dye Used | Viscosity of Ink (cps, 25° C.) | Surface Tension of Ink (dyne/cm, 25° C.) |
| --- | --- | --- | --- |
| 39 | Cathilon Red GH (C.I. Basic Red 38) | 4.0 | 42.7 |
| 40 | Cathilon Yellow GLH (C.I. Basic Yellow 14) | 3.6 | 42.3 |
| 41 | Cathilon Blue GLH (C.I. Basic Blue 65) | 4.5 | 42.0 |

EXAMPLES 42 AND 43

A polymerization flask, the inner atmosphere of which was substituted with nitrogen, was charged with 0.2 g of Emulgen 935 (polyoxyethylene nonylphenol ether supplied by Kao-Atlas), 0.2 g of Emulgen 920 (polyoxyethylene nonylphenol ether supplied by Kao-Atlas), 0.3 g of acidic sodium sulfite (NaHSO₃) and 46.5 g of water, and the temperature was elevated to 40° C. in a nitrogen current. A liquid monomer mixture comprising 30 g of styrene, 67 g of ethyl acrylate and 3 g of 2-hydroxyethyl methacrylate, an aqueous solution of 2.5 g of sodium p-styrene-sulfonate having a purity of 82.0% (Spinomar NaSS supplied by Toyo Soda) in 47.5 g of water and an aqueous solution of a polymerization initiator formed by dissolving 0.5 g of ammonium persulfate in 49.5 g of water were added into the polymerization flask over a period of 3 hours and polymerization was carried out at 40° C. After completion of the addition, the polymerization was further conducted at 40° C. for 3 hours.

In the obtained polymer emulsion, the average particle size of the polymer particles was about 0.10 μm. From the result of the determination of sulfur in the polymer, it was found that the sulfonic acid group was contained in the polymer at a concentration of $1.2 \times 10^{-4}$ gram-equivalent/g polymer. The non-volatile matter content in the polymer emulsion at 110° C. was 41.1%.

Then, about 100 g of the obtained polymer emulsion was diluted with about 500 ml of water and subjected to distillation under a reduced pressure by a rotary evaporator to remove the trace of the unreacted monomers, whereby 100 g of an emulsion having a solid content of 20% was obtained.

To this emulsion were added 0.75 g of a basic dye (supplied by Hodogaya Kagaku) shown in Table 9 and 10 g of an aqueous 20% solution of acetic acid, and the temperature was elevated with stirring and the mixture was stirred at 95° to 97° C. for 90 minutes and then cooled to 25° C. The mixture was subjected to the filtration test using an ultrafiltration membrane (TS-100 supplied by Toyo Soda) under a pressure of 2 kg/cm² (gauge pressure). It was confirmed that inorganic ions were completely removed.

The solid content of the obtained colored liquid was adjusted to 20% again to obtain an ink of the present invention. The ink could be filtered by using Toyo Filter Paper No. 131 without clogging. When the ink was stored at 50° C. for 1 month, the viscosity was not changed with the lapse of time and no precipitate as formed.

The ink of the present invention was coated on art paper by a 1-mil doctor blade and dried at room temperature. When the light fastness was examined by a xenon arc fade-ometer, it was found that the sample had a good light fastness. When this sample was immersed in water, bleeding or dissolution of the ink was not observed. The properties of the ink were as shown in Table 9.

TABLE 9

| Example No. | Dye Used | Viscosity of Ink (cps, 25° C.) | Surface Tension of Ink (dyne/cm, 25° C.) |
| --- | --- | --- | --- |
| 42 | Cathilon Blue 5GLH | 2.7 | 45.5 |
| 43 | Methylene Blue FZ | 3.2 | 46.8 |

EXAMPLES 44 THROUGH 46

A polymerization flask, the inner atmosphere of which was substituted with nitrogen, was charged with 1.5 g of Emulgen 935 (polyoxyethylene nonylphenol ether supplied by Kao-Atlas), 0.3 g of acidic sodium sulfite ($NaHSO_3$) and 47 g of water, and the temperature was elevated to 45° C. with stirring in a nitrogen current. A liquid monomer mixture comprising 35 g of methyl methacrylate, 50 g of ethyl acrylate and 13 g of n-butyl acrylate, an aqueous solution formed by dissolving 2.0 g of acrylamide in 50 g of an aqueous 6% solution of potassium p-styrene-sulfonate and an aqueous solution of a polymerization initiator formed by dissolving 0.5 g of potassium persulfate in 49.5 g of water were added into the polymerization flask over a period of 3 hours and polymerization was carried out at 45° C. After completion of the addition, the polymerization was further conducted at 45° C. for 3 hours.

In the obtained polymer emulsion, the average particle size of the polymer particles was 0.08 μm. From the result of the determination of sulfur in the polymer, it was found that the sulfonic acid group was contained in the polymer at a concentration of $1.4 \times 10^{-4}$ gram-equivalent/g polymer. The non-volatile matter content in the polymer emulsion at 110° C. was 41.3%.

About 100 g of the obtained polymer emulsion was diluted with about 500 ml of water, and the liquid was subjected to distillation under a reduced pressure by a rotary evaporator to remove the trace of the unreacted monomers, whereby 100 g of an emulsion having a solid content of 20% was obtained.

To this emulsion were added 0.7 g of a basic dye (supplied by Hodogaya Kagaku) shown in Table 10 and 10 g of an aqueous 20% solution of acetic acid. The temperature was elevated with stirring, and the mixture was stirred at 95° to 98° C. for 60 minutes and cooled to room temperature. The mixture was subjected to the filtration test using an ultrafiltration membrane (TS-100 supplied by Toyo Soda) under a pressure of 2 kg/cm² (gauge pressure). It was confirmed that inorganic ions were completely removed. The solid content of the obtained colored liquid was adjusted to 20% again to obtain an ink of the present invention. The ink could be filtered through Toyo Filter Paper No. 131 without clogging. When the ink was stored at 50° C. for 1 month, the viscosity was not changed with the lapse of time and no precipitate was formed.

The ink of the present invention was coated on art paper by a 1-mil doctor blade and dried at room temperature. When the light fastness was tested by a xenon arc fade-ometer, it was found that the sample had a good light fastness. When this sample was immersed in water, blurring or dissolution of the ink was not observed. The properties of the ink were as shown in Table 10.

TABLE 10

| Example No. | Dye Used | Viscosity of Ink (cps, 25° C.) | Surface Tension of Ink (dyne/cm, 25° C.) |
| --- | --- | --- | --- |
| 44 | Cathilon Yellow T-RLH | 3.4 | 44.3 |
| 45 | Cathilon Blue 5GLH (C.I. Basic Blue 45) | 4.0 | 45.0 |
| 46 | Cathilon Red 6BH (C.I. Basic Violet 7) | 3.4 | 44.0 |

We claim:

1. An aqueous composition of a colored polymer which comprises (a) a homopolymer of an ethylenically unsaturated sulfonic acid or its salt or (b) a copolymer of an ethylenically unsaturated sulfonic acid or its salt with other ethylenically unsaturated monomer, said homopolymer or copolymer being dyed with a basic dye and having a film-forming temperature of not higher than 35° C.

2. An aqueous composition of a colored polymer as set forth in claim 1, wherein the ethylenically unsaturated sulfonic acid or its salt is styrene-sulfonic acid or its salt.

3. An aqueous composition of a colored polymer as set forth in claim 1, which is an aqueous solution of the dyed homopolymer or copolymer.

4. An aqueous composition of a colored polymer as set forth in claim 3, wherein said copolymer is a copolymer of an ethylenically unsaturated sulfonic acid or its salt with at least one monomer selected from the group consisting of 2-hydroxyethyl acrylate, 2-hydroxyethyl methacrylate, acrylamide and methacrylamide.

5. An aqueous composition of a colored polymer as set forth in claim 1; which is a solution of a water-insoluble product obtained by dyeing a water-soluble polymer containing a hydroxyl group in an amount of at least $1 \times 10^{-3}$ gram-equivalent/g polymer in a mixed solvent of water and a water-soluble organic solvent.

6. An aqueous composition of a colored polymer as set forth in claim 5, wherein the water-soluble organic solvent is a compound represented by the following general formula (I):

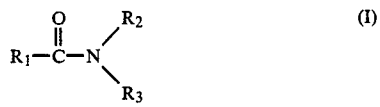

wherein $R_1$ stands for a hydrogen atom or a methyl group and $R_2$ and $R_3$ stand for a hydrogen atom or a methyl or ethyl group, or a compound represented by the following general formula (II):

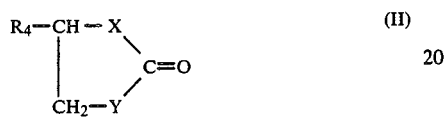

wherein $R_4$ stands for a hydrogen atom or a methyl group, X stands for a group NH or $NCH_3$ or an oxygen atom, and Y stands for a group $CH_2$ or an oxygen atom.

7. An aqueous composition of a colored polymer as set forth in claim 1, which is a polymer emulsion containing colored particles of a copolymer of a hydrophilic ethylenically unsaturated monomer including at least an ethylenically unsaturated sulfonic acid or its salt with other ethylenically unsaturated monomer, said copolymer particles having (a) a sulfonic acid group in an amount of at least $2 \times 10^{-5}$ gram-equivalent/g polymer and (b) an average particle size of not larger than 1 μm.

8. A process for the preparation of an aqueous composition of colored polymer as set forth in claim 7, which comprises:
emulsion-polymerizing 100 g of a monomeric mixture comprised of (1) up to 10 g of a hydrophilic ethylenically unsaturated monomer containing at least $2 \times 10^{-3}$ gram-equivalent of an ethylenically unsaturated sulfonic acid or its salt and (2) at least 90 g of a hydrophobic ethylenically unsaturated monomer containing at least 30 g of at least one hydrophobic ethylenically unsaturated monomer selected from the group consisting of ethylene, isobutylene, butadiene, isoprene, chloroprene, vinyl acetate, vinyl propionate, vinylidene chloride, methyl acrylate, ethyl acrylate, n-propyl acrylate, n-butyl acrylate, sec-butyl acrylate, t-butyl acrylate, isobutyl acrylate, n-hexyl acrylate, cyclohexyl acrylate, n-octyl acrylate, 2-ethylhexyl acrylate, dodecyl acrylate, tetradecyl acrylate, n-propyl methacrylate, n-butyl methacrylate, t-butyl methacrylate, sec-butyl methacrylate, isobutyl methacrylate, n-hexyl methacrylate, n-octyl methacrylate, 2-ethylhexyl methacrylate and dodecyl methacrylate at a temperature of not higher than 100° C. in water in an amount corresponding to 35 to 80% by weight based on the total amount of the water and the monomeric mixture, and then adding a basic dye to the resulting polymer emulsion, or carrying out said emulsion polymerization in the presence of a basic dye.

9. An aqueous ink comprising an aqueous colored polymer as set forth in claim 1.

10. An ink for the ink jet recording which comprises an aqueous colored polymer as set forth in claim 1.

11. A colorant for paper, leather, fiber or wood which comprises an aqueous colored polymer as set forth in claim 1.

* * * * *